(12) United States Patent
Bharti et al.

(10) Patent No.: US 10,583,613 B2
(45) Date of Patent: Mar. 10, 2020

(54) 3D PRINTING ON THE SURFACE OF AN ACOUSTIC HOLOGRAM

(71) Applicant: International Business Machines Corporation, Armonk, NY (US)

(72) Inventors: Harish Bharti, Pune (IN); Abhay K. Patra, Pune (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 15/626,499

(22) Filed: Jun. 19, 2017

(65) Prior Publication Data
US 2018/0361680 A1    Dec. 20, 2018

(51) Int. Cl.
*B29C 67/00*    (2017.01)
*B33Y 30/00*    (2015.01)
(Continued)

(52) U.S. Cl.
CPC ........ *B29C 67/0088* (2013.01); *B29C 64/159* (2017.08); *B29C 64/386* (2017.08);
(Continued)

(58) Field of Classification Search
CPC . B29C 67/0088; B29C 64/112; B29C 64/159; B29C 64/386; G05B 19/4097; G05B 2219/49007; G05B 2219/49023; G05B 19/4099; B33Y 30/00; B33Y 50/02; B33Y 50/00; B33Y 99/00

See application file for complete search history.

(56) References Cited

U.S. PATENT DOCUMENTS

| | | | | | |
|---|---|---|---|---|---|
| 3,585,848 A | * | 6/1971 | Korpel | ............... | G01N 29/0609 |
| | | | | | 73/604 |
| 3,633,407 A | * | 1/1972 | Whitman | .................. | G02F 1/11 |
| | | | | | 73/604 |

(Continued)

FOREIGN PATENT DOCUMENTS

EP    3034281    6/2016

OTHER PUBLICATIONS

Victoria Neumark, A spider's web, Sep. 21, 2001, Retrieved from Internet: https://www.tes.com/news/tes-archive/tes-publication/a-spiders-web, 5 pages.

(Continued)

*Primary Examiner* — Nahida Sultana
(74) *Attorney, Agent, or Firm* — Schmeiser, Olsen & Watts; Mark C. Vallone (57) ABSTRACT

A method and associated systems for 3D printing on the surface of an acoustic hologram uses an array of sound-wave emitters to generate a three-dimensional acoustic hologram of an object to be printed. This hologram is composed of acoustic standing waves that exert invisible acoustic radiation forces in three-dimensional space that feel like surfaces of a solid object. The resulting hologram creates a tactile illusion of an object floating in space within a three-dimensional printing area. When a 3D-printing medium is applied to the surface of the hologram, the medium solidifies on the hologram's surface to generate a hollow shell in the shape of the object to be printed.

20 Claims, 8 Drawing Sheets

(51) Int. Cl.
G05B 19/4097 (2006.01)
B33Y 50/02 (2015.01)
B29C 64/386 (2017.01)
B29C 64/159 (2017.01)
B33Y 50/00 (2015.01)
B33Y 99/00 (2015.01)
G05B 19/4099 (2006.01)
B29C 64/112 (2017.01)

(52) U.S. Cl.
CPC .............. *B33Y 30/00* (2014.12); *B33Y 50/00* (2014.12); *B33Y 50/02* (2014.12); *B33Y 99/00* (2014.12); *G05B 19/4097* (2013.01); *G05B 19/4099* (2013.01); *B29C 64/112* (2017.08); *G05B 2219/49007* (2013.01); *G05B 2219/49023* (2013.01)

(56) References Cited

U.S. PATENT DOCUMENTS

| | | | | |
|---|---|---|---|---|
| 3,670,098 A * | 6/1972 | Korpel | ............... | H04N 13/00 348/163 |
| 3,745,812 A * | 7/1973 | Korpel | ............... | G01N 29/0609 73/604 |
| 3,790,281 A * | 2/1974 | Kessler | ............ | G01N 29/0609 356/72 |
| 3,829,838 A * | 8/1974 | Lewis | ............... | G02B 27/2271 345/419 |
| 3,990,296 A * | 11/1976 | Erikson | ............... | A61B 8/0866 73/605 |
| 5,627,319 A * | 5/1997 | Greene | ............. | G01N 29/0663 73/603 |
| 2016/0107380 A1 | 4/2016 | Smoot et al. | | |
| 2019/0033978 A1* | 1/2019 | Eijkelenboom | ......... | G06F 3/017 |

OTHER PUBLICATIONS

Colin Jeffrey, New ultrasound research creates holographic objects that can be seen and felt, Dec. 2, 2014, Retrieved from Internet: http://newatlas.com/ultrasound-3d-haptic-hologram/35032/, 3 pages.

Mikael Angelo Francisco, Published: Mar. 10, 2014, Spider-man's web shooters almost a reality: artificial spider silk invented, Retrieved from Internet: http://www.gmanetwork.com/news/scitech!science/351921/spider-m . . . , 3 pages.

Marzo et al., Holographic acoustic elements for manipulation of levitated objects, Nature Communications 6, Article, No. 8661, published online: Oct. 27, 2015, Retrieved from Internet: https://www.nature.com/articles/ncomms966I, 28 pages.

Evan Ackerman, Acoustic Holograms Form Ultrasonic Tractor Beams for Tiny Objects, Posted Oct. 27, 2015, Retrieved from Internet: http://spectrum.ieee.org/tech-talk/computing|hardware/acoustic-holo. . . , 3 pages.

Richard Gray, Star Trek-style tractor beam becomes a reality: Device can lift and move small objects using sound holograms, Daily Mail, Published Oct. 27, 2015, Retrieved from Internet: http://www.dailymail.co.uk/sciencetech/article-3291950/Star-Trek-styl. . . , 26 pages.

Mary Beth Griggs, This Tractor Beam Uses Holograms Made of Sound to Move Objects, Popular Science, Oct. 27, 2015, Retrieved from Internet: http://www.popsci.com/scientists-create-tractor-beam-using-sound-ho., 18 pages.

Brian Dodson, Ultrasonic force field provides tactile sensations in midair, Oct. 11, 2013, Retrieved from Internet: http://newatlas.com/ultrasonic-tactile-haptic-interaction-holodeck/2936(, 3 pages.

Wikipedia, Acoustic radiation force, Retrieved from Internet on Jun. 15, 2017; https://en.wikipedia.org/wiki/Acoustic_radiation_fore, 4 pages.

Kian-Meng Lim, Calculation of Acoustic Radiation Force and Moment in Microfluidic Devices, World Scientific, 5th International Symposium on Physics of Fluids (ISPF5) International Journal of Modern Physics: Conference Series, vol. 34 (2014) 1460380 (16 pages) DOI: 10.1142/S2010194514603809, Ppublished on Nov. 17, 2014, 6 pages.

* cited by examiner

3D PRINTING ON THE SURFACE OF AN ACOUSTIC HOLOGRAM

BACKGROUND

The present invention relates to 3D-printing technology and in particular to using ultrasonic acoustic holography to print a 3D object.

Computer-controlled additive 3D printers "print" a three-dimensional object by building up successive layers of a construction material, such as a plastic thread, to form a desired shape.

High-amplitude sound waves are capable of exerting a palpable force at a point in space that may feel at least partially solid to the touch. By emitting and focusing such sound waves in a particular configuration, it is possible to create a tactile illusion of a tangible but invisible three-dimensional "object" at a specific location in space.

SUMMARY

An embodiment of the present invention provides a 3D-printing system comprising a processor, a memory coupled to the processor, one or more arrays of sound-wave emitters, one or more spraying components, and a computer-readable hardware storage device coupled to the processor, the storage device containing program code configured to be run by the processor via the memory to implement a method for 3D printing on the surface of an acoustic hologram, the method comprising:

the printer receiving an identification of a three-dimensional object to be printed;

the printer, in response to the receiving, directing an emitter array of the one or more arrays of sound-wave emitters to generate an acoustic hologram, where the acoustic hologram is an invisible but tactile three-dimensional representation of the object to be printed; and the printer, in response to the receiving, instructing a sprayer of the one or more spraying components to spray a printing medium onto a surface of the acoustic hologram, such that the printing medium solidifies on the surface of the acoustic hologram to form a solid representation of a corresponding surface of the three-dimensional object to be printed Another embodiment of the present invention provides a method for 3D printing on the surface of an acoustic hologram, the method comprising:

a 3D-printing system, where the system comprises a processor, a memory coupled to the processor, one or more arrays of sound-wave emitters, one or more spraying components, and a computer-readable hardware storage device coupled to the processor, the storage device containing program code configured to be run by the processor via the memory to implement the method for 3D printing on the surface of an acoustic hologram, the method comprising:

the printer receiving an identification of a three-dimensional object to be printed;

the printer, in response to the receiving, directing an emitter array of the one or more arrays of sound-wave emitters to generate an acoustic hologram, where the acoustic hologram is an invisible but tactile three-dimensional representation of the object to be printed; and the printer, in response to the receiving, instructing a sprayer of the one or more spraying components to spray a printing medium onto a surface of the acoustic hologram, such that the printing medium solidifies on the surface of the acoustic hologram to form a solid representation of a corresponding surface of the three-dimensional object to be printed.

Yet another embodiment of the present invention provides a computer program product, comprising a computer-readable hardware storage device having a computer-readable program code stored therein, the program code configured to be executed by 3D-printing system comprising a processor, a memory coupled to the processor, one or more arrays of sound-wave emitters, one or more spraying components, and a computer-readable hardware storage device coupled to the processor, the storage device containing program code configured to be run by the processor via the memory to implement a method for 3D printing on the surface of an acoustic hologram, the method comprising:

the printer receiving an identification of a three-dimensional object to be printed;

the printer, in response to the receiving, directing an emitter array of the one or more arrays of sound-wave emitters to generate an acoustic hologram, where the acoustic hologram is an invisible but tactile three-dimensional representation of the object to be printed; and the printer, in response to the receiving, instructing a sprayer of the one or more spraying components to spray a printing medium onto a surface of the acoustic hologram, such that the printing medium solidifies on the surface of the acoustic hologram to form a solid representation of a corresponding surface of the three-dimensional object to be printed.

DETAILED DESCRIPTION

Acoustic radiation force (ARF) is a phenomenon that manifests itself as a palpable force exerted in free space by a sound wave. An ARF may be strong enough to create a tactile illusion of a physical surface floating in space and it is even possible to generate an ARF strong enough to move a stationary object or retard the motion of a moving object.

It is known in the art that a magnitude of an acoustic radiation force exerted by a sound wave may be computed as a function of:
- a known absorption coefficient of the medium through which the sound wave propagates;
- a known longitudinal wave speed of the sound wave through the medium through which the sound wave propagates; and
- the amplitude of the propagated sound wave.

In embodiments of the present invention, it is thus possible to manipulate ARFs by adjusting amplitudes of sound waves emitted from an array of sound-wave transducers, such as ultrasound emitters or loudspeakers. One or more of these arrays may be physically configured, with or without complementary acoustic reflectors, to generate acoustic reflections and interference patterns that produce precisely defined standing waves. These standing waves may express themselves as a pattern of nodes, where air pressure and sound-wave amplitude are greater at a node than they are at locations between nodes.

A sufficiently powerful array of emitters may be configured to generate standing waves that exert predictable amplitudes of acoustic radiation force at specific points in three-dimensional space. By selecting the physical orientation and relative position of each emitter in the array, and by choosing a particular frequency, phase, and amplitude of each sound wave produced by an emitter, it is possible to project ARFs into space that in aggregate assume the shape of a complex surface or boundary of a three-dimensional object. Such an "acoustic hologram" may feel like an invisible, three-dimensional, solid or semi-solid, object floating in space.

It is also possible to vary characteristics of such an acoustic hologram, such as its surface rigidity, size, orientation, location, or shape, by varying a physical orientation or position of an emitter in array or by varying a physical characteristic of a sound wave produced by an emitter of the array.

Acoustic radiation force is a phenomenon that is known in the art. See, e.g.:
  https://en.wikipedia.org/wiki/Acoustic_radiation_force Methods of using an array of ultrasound emitters to generate a tactile illusion of invisible, floating surfaces and objects are described in:
  http://newatlas.com/ultrasonic-tactile-haptic-interaction-holodeck/29360/
  and
  http://www.popsci.com/scientists-create-tractor-beam-using-sound-holograms Methods of computing ARFs capable of manipulating physical particles in free space are described in:
  http://www.worldscientific.com/doi/pdf/10.1142/S2010194514603809
  and
  http://www.dailymail.co.uk/sciencetech/article-3291950/Star-Trek-style-tractor-beam-reality-Device-captures-lifts-moves-small-objects-using-sound-holograms.html Examples of using arrays of ultrasound emitters, along with acoustic lenses, reflectors, or other auxiliary components, to generate acoustic holograms have been described in:
  http://spectrum.ieee.org/tech-talk/computing/hardware/acoustic-holograms-form-ultrasonic-tractor-beams-for-tiny-objects
  https://www.nature.com/articles/ncomms9661
  and
  http://newatlas.com/ultrasound-3D-haptic-hologram/35032/

Additive 3D printers manufacture (or "print") three-dimensional objects under the control of a computerized device, such as a personal computer or an embedded processor. Unlike subtractive 3D printers that may carve a 3D object out of a block of material, a 3D printer that uses an additive process may build up a 3D object from scratch. An additive printer may, for example, add one or more thin layers, threads, or other elements of construction material with each pass, much like the way a conventional printer might build an image by means of successive passes over a printing medium, printing a line of pixels on the medium with each pass.

Embodiments of the present invention combine these two technologies into a type of additive 3D-printing methodology that sprays tiny particles of printing material into a printing chamber. These particles are formulated such that they solidify when exposed to air or upon contacting a solid surface, much like the way droplets of spray paint congeal into a solid coating when being sprayed onto a solid object.

Here, however, the "solid object" onto which the 3D-printing material is sprayed is a three-dimensional acoustic hologram projected into the chamber by one or more arrays of sound-emitting transducers. Embodiments and examples described in this document may, for pedagogical purposes, characterize these devices as "ultrasound emitters," but other embodiments of the present invention may comprise other types of transducers capable of emitting sound waves. Yet other embodiments may use other methods of applying construction material to the surface of the acoustic hologram, such as by brushing or painting a liquid material onto the hologram.

It is known in the art that such an emitter array can be configured to produce a specific intensity or value of an acoustic radiation force at a particular point in space. In embodiments of the present invention, an acoustic radiation force that forms the seemingly solid surface of the hologram is configured to be capable of stopping sprayed particles at a particular point in space. This configuring may comprise adjusting the frequency, direction, amplitude, or phase of each emitted sound wave so as to create an ARF at each point on the surface of the hologram sufficient to overcome the kinetic energy of the sprayed particles that reach that point on the surface.

This configuring may in some embodiments comprise adjusting a position, orientation, or operation of one or more emitters in order to account for certain variations that may occur in a sprayed particle's direction or kinetic energy. These variations may be caused, for example, by variations in the distance between a spray nozzle and the surface onto which the nozzle sprays droplets, by variations in the speed of sprayed droplets, or by variations in the speed of a droplet as it passes between a sprayer nozzle and a hologram surface. The configuring may also in some embodiments be made to compensate for variations in droplet size or mass, in droplet momentum, viscosity, temperature, or density, or in a chemical or physical composition of a droplet.

Embodiments of the invention may generate hollow three-dimensional objects in this manner by spraying a layer, or a set of successive layers, of printing material on the surfaces of an acoustic hologram. In some embodiments, a shape, solidity, size, or orientation of a hologram surface may be varied during the printing process in order to print more complex shapes. In some cases, the ARFs generated by the emitters may be used to move, rotate, or otherwise adjust the position of previously printed, condensed droplets so as to allow the printing of a shape that would otherwise be too complex or detailed to print. Such adjustment may also allow printers that contain only a smaller number of emitters, of emitter arrays, or of sprayers to print 3D objects that would otherwise require a greater number of emitters or sprayers positioned to emit sound or to spray particles from different directions.

Such embodiments may provide a fast, cost-effective way to generate hollow objects, such as lightweight toys, automotive components, electronic cases and chassis, protective covers, or product packaging.

Other embodiments may use variations of this method to produce solid objects, seemingly solid objects that have a relatively small hollow core, or objects that have an internal structure. Such embodiments could, for example, allow a printer to print a dental crown or bridge, a medical prosthetic, or a multi-compartment container.

Such embodiments might comprise adjusting emitters in real time, as nozzles continue to spray droplets, to generate an acoustic hologram that grows larger during one or more spraying sessions. In such a case, a solid object may be formed by spraying droplets onto the hologram as the hologram gets larger, eventually building up a thick layer of material around a relatively small hollow core. In other embodiments, the emitters could be configured to produce ARFs capable of suspending a hollow 3D-printed object in space, allowing additional layers of droplets to be sprayed onto otherwise-hidden surfaces.

In some embodiments, sprayers may be capable of varying the chemical composition or other physical property of sprayed droplets on the fly, or of switching between different types of sprayed material on the fly. This may allow a 3D printer to print an object that incorporates regions of differing tensile strength, elasticity, texture, color, density, or brittleness. In yet other embodiments, one or more physical characteristics of a gaseous or fluid medium in the printing chamber may be varied in order to dynamically alter a characteristic of the sprayed material. Such characteristics may comprise a combination of parameters like temperature, pressure, density, turbulence, volume, humidity, and chemical composition.

Embodiments of the present invention may spray or otherwise transport any sort of additive 3D-printing material capable of solidifying or condensing upon contact with air (or whatever gas exists in a printing chamber) or upon contacting a solid or acoustic surface capable of stopping a movement of a printing material.

Printing materials capable of being used in embodiments of the present invention have been described in numerous publications. One example is the artificial "spider silk" described at:

http://www.gmanetwork.com/news/scitech/science/35192/spider-man-s-web-shooters-almost-a-reality-artificial-spider-silk-invented/story and https://www.tes.com/news/tes-archive/tes-publication/a-spiders-web The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
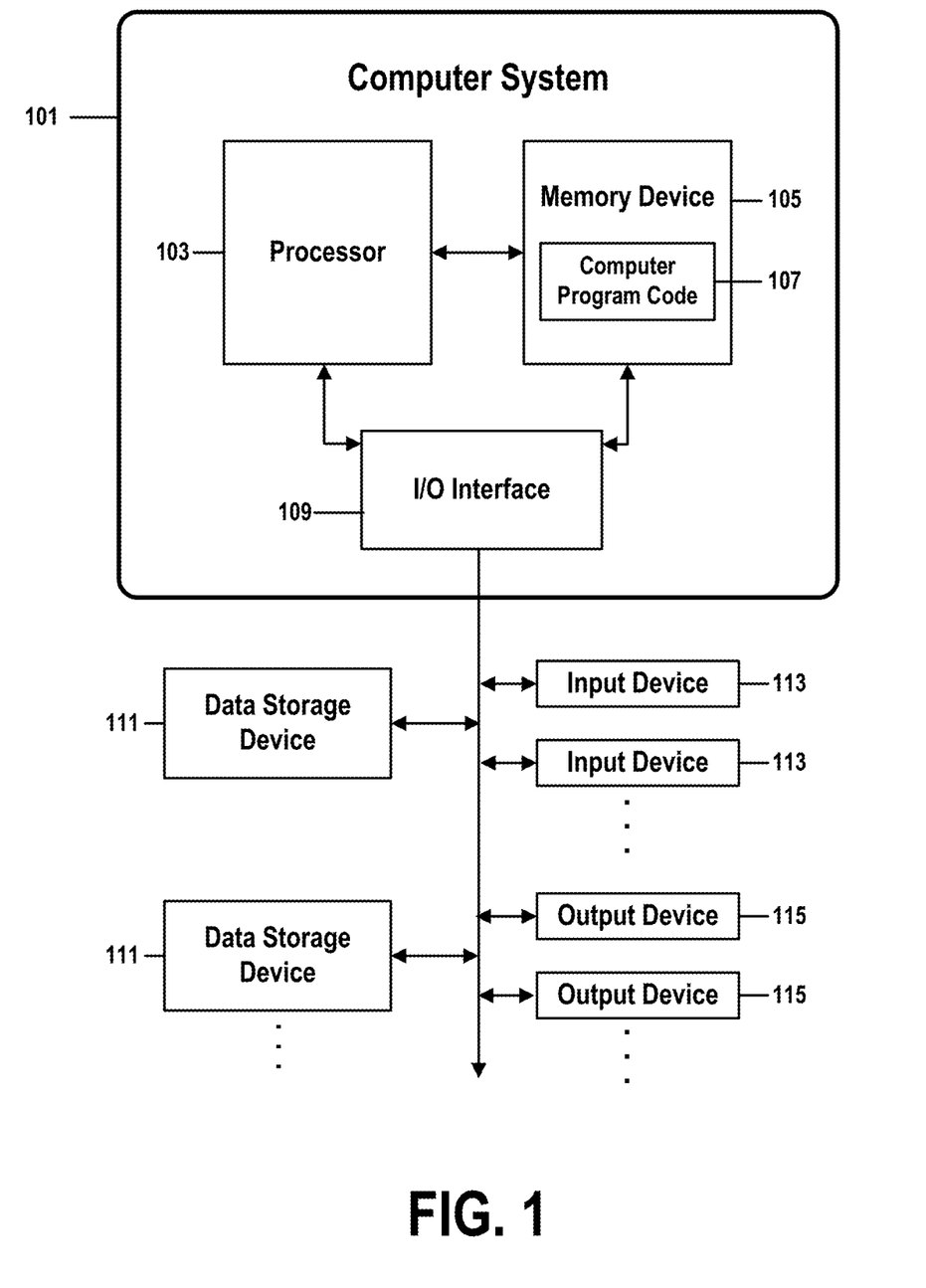
FIG. 1 shows a structure of a computer system and computer program code that may be used to implement a method for 3D printing on the surface of an acoustic hologram in accordance with embodiments of the present invention.

FIG. 1 shows a structure of a computer system and computer program code that may be used to implement a method for 3D printing on the surface of an acoustic hologram in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for 3D printing on the surface of an acoustic hologram in accordance with embodiments of the present invention, and may implement other embodiments described in this specification, including the methods illustrated in FIGS. 1-7. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for 3D printing on the surface of an acoustic hologram.

Any of the components of the present invention could be created, integrated, hosted, maintained, deployed, managed, serviced, supported, etc. by a service provider who offers to facilitate a method for 3D printing on the surface of an acoustic hologram. Thus the present invention discloses a process for deploying or integrating computing infrastructure, comprising integrating computer-readable code into the computer system 101, wherein the code in combination with the computer system 101 is capable of performing a method for 3D printing on the surface of an acoustic hologram.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for 3D printing on the surface of an acoustic hologram may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for 3D printing on the surface of an acoustic hologram is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
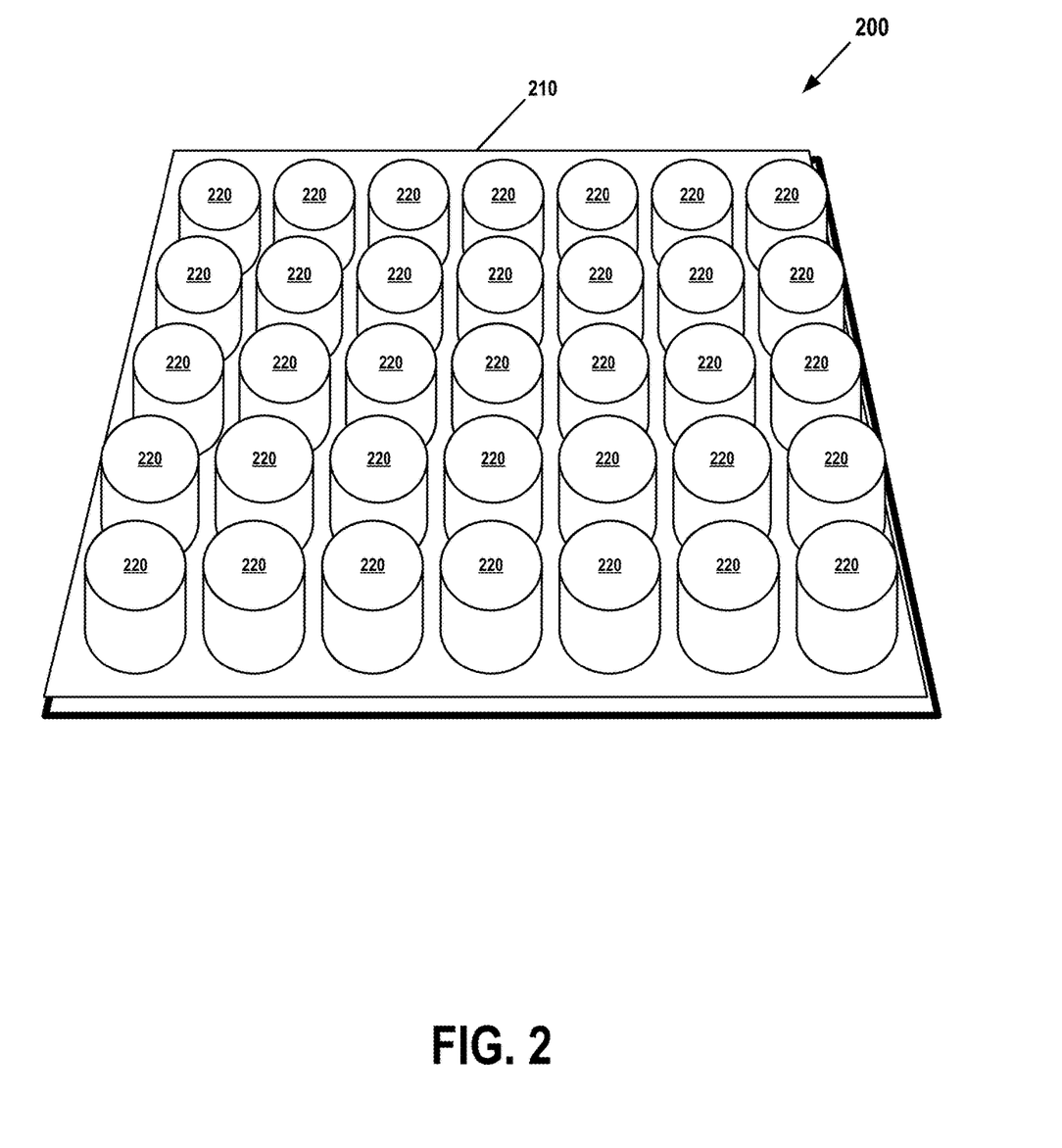
FIG. 2 shows an example of a rectangular array of transducers capable of emitting sound waves.

FIG. 2 shows an example of a rectangular array 200 of transducers 220 capable of emitting sound waves. FIG. 2 shows elements identified by reference numbers 200-220.

In FIG. 2, each ultrasonic emitter 220 is capable of emitting ultrasonic sound waves in a region above the array 200. These emitters 220 are arranged on a platform 210. In some embodiments, these emitters 220 may be rigidly fixed in place, but other embodiments may comprise an ability to change the position or orientation of one or more of the emitters 220 as required to print certain types of objects.

As described above, the emitters 220 may be arranged so as to produce interference patterns and standing waves capable of creating a tangible acoustic radiation force at a specific point in three-dimensional space. In the simple single-array 200 embodiment shown in FIG. 2, these points Although the exemplary array 200 of FIG. 2 comprises rectangular platform 210 onto which are arranged 35 transducers 220, other embodiments of the present invention may comprise arrays that comprise a differently shaped platform, a different number of emitters, or a different physical arrangement of emitters. Other embodiments may be capable of moving emitters to different positions on a platform or of tilting or reorienting one or more emitters, in order to produce a particular ARF.

Figure 3:
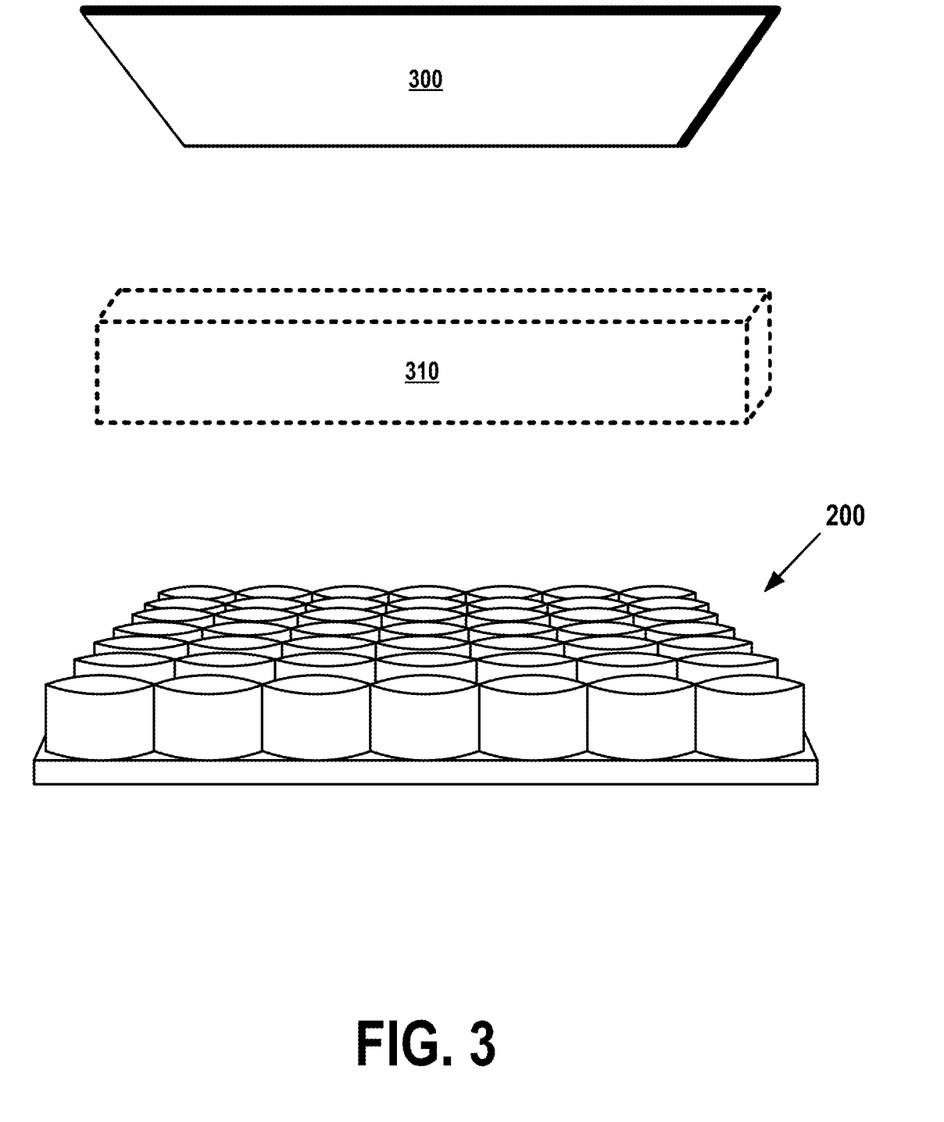
FIG. 3 shows an example of a 3D printer that comprises a single rectangular array of sound-wave emitters and a reflector component capable of reflecting emitted sound waves.

FIG. 3 shows an example of a 3D printer that comprises a single rectangular array 200 of sound-wave emitters and a reflector component 300 capable of reflecting emitted sound waves. FIG. 3 shows elements identified by reference numbers 200-310.

The array 200 is identical in form and function to array 200 of FIG. 2, which comprises a platform 210 and a set of ultrasonic emitters 220. (Items 210 and 220 are not numerically referenced in FIG. 3.) Like the array 200 of FIG. 2, this array is capable of emitting a set of ultrasonic sound waves configured so as to form interference patterns that result in standing waves capable of exerting acoustic radiation forces of specific intensities at particular points in three-dimensional space.

Reflector 300 is capable of reflecting the ultrasonic sound waves emitted by array 200. In some embodiments, reflector 300 may comprise two or more component reflectors configured to allow the ultrasonic sound waves to generate specific standing waves. The orientation, acoustic reflectivity, rigidity, and other physical characteristics of reflector 300 (or of smaller component reflectors comprised by reflector 300) may be selected so that the resulting standing waves produce desired ARFs at specific points within a three-dimensional printing area or volume 310.

Some embodiments, not shown in the figures, may comprise a component that combines an emitter array with a reflector. For example, an array that is otherwise similar to array 200 may comprise an area that, rather than being fully populated by emitters 220, is instead composed of an unobstructed acoustically reflective surface. Two such array/reflectors might then be configured within a printer at opposing positions, such as those of array 200 and reflector 300 in FIG. 3. If the size and location of each array's reflective region is selected so as to facilitate the generation of acoustic radiation forces within a resulting printing volume or region (possibly similar to item 310), such an embodiment might provide greater flexibility, resolution, or ARF-generating capability.

In other embodiments, the printing volume 310 may assume other two-dimensional or three-dimensional shapes, sizes, and orientations, but all embodiments that comprise a single array and a single reflector will be capable of creating ARFs within a three-dimensional region located, as shown in FIG. 3, between an array 200 and a complementary reflector 300.

In the example of FIG. 3, the array 200 is capable of producing ultrasonic sound waves that, when reflected back from reflector 300, generate standing waves of a known frequency, period, and amplitude. As explained above, these standing waves may be configured such that nodes of the standing waves exert a set of ARFs capable of defining a seemingly solid, invisible surface of a three-dimensional object.

As will be shown in subsequent figures, not all embodiments of the present invention comprise reflectors, instead generating standing waves by other means known in the art, such as by aligning emitters to produce parallel, otherwise-identical, waves that are 180 degrees out of phase. Yet other embodiments may pair a single array 200 with multiple reflectors 300 or may pair a single reflector 300 with multiple arrays 200. In all these cases, methods of configuring and aligning each array 200 and reflector 300 in order to produce desired standing waves are known in the art of acoustic engineering.

Figure 4:
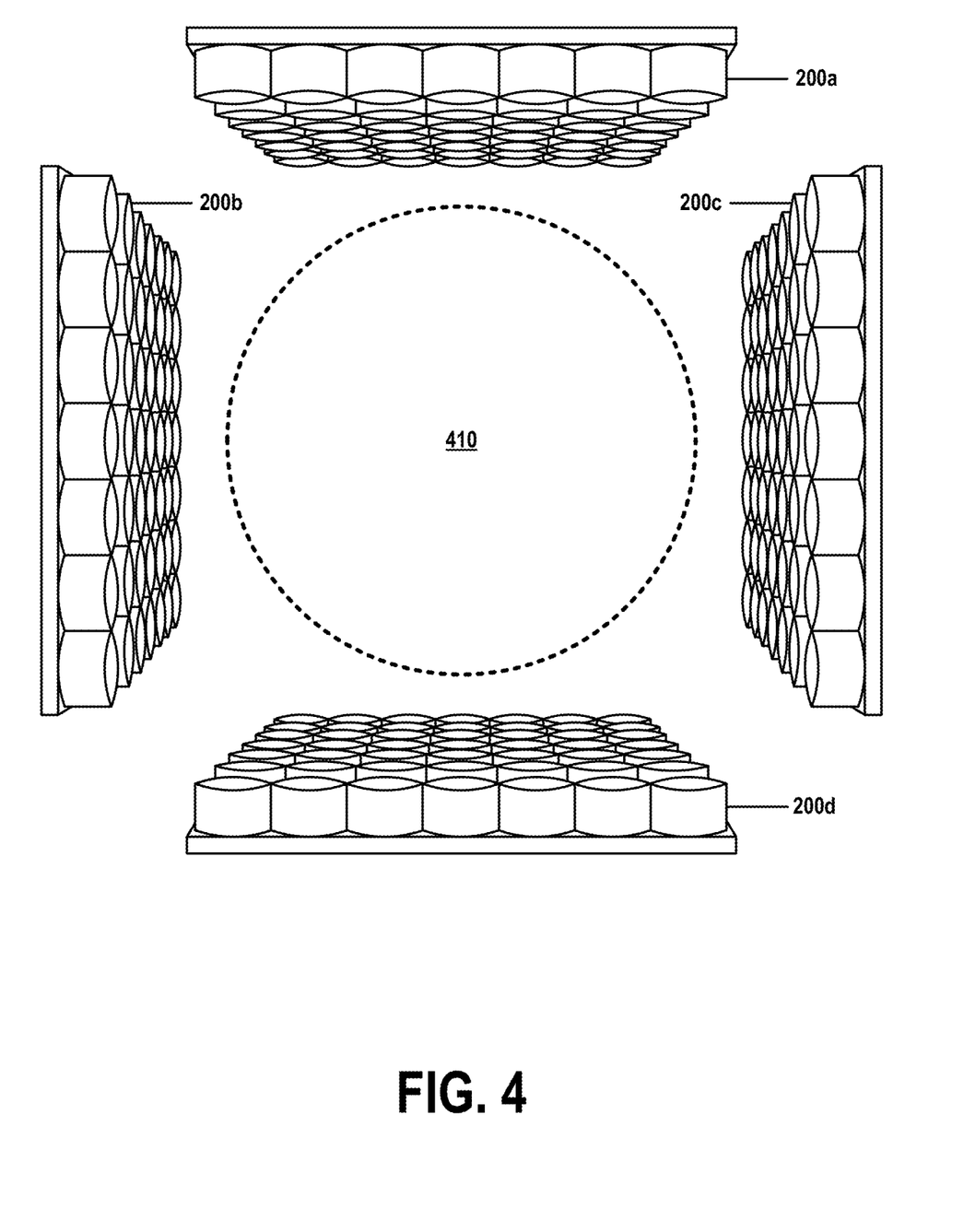
FIG. 4 shows an exemplary configuration of sound-wave emitter arrays in a 3D printer that comprises four rectangular arrays of emitters.

FIG. 4 shows an exemplary configuration of sound-wave emitter arrays in a 3D printer that comprises four rectangular arrays 200a-200d of emitters. This example may further include one or more reflectors 300, which are not shown in FIG. 4. FIG. 4 shows elements identified by reference numbers 200a-410.

Arrays 200a-200d are identical in form and function to the class of ultrasonic-emitter arrays 200 of FIG. 2. Spherical printing region 410 is analogous to rectangular region 310 of FIG. 3. As in FIG. 3, the emitters 200a-200d are capable of generating acoustic standing waves (with or without the use of reflectors analogous to the reflector 300 of FIG. 3). These standing waves may comprise nodes capable of exerting acoustic radiation forces at locations within the three-dimensional printing region 410.

Although the physical shape of printing volume 410 is shown to be spherical in this example, arrays 200a-200d may in other embodiments produce regions that are ellipsoid, asymmetrical, or irregular, as is known in the art. In all cases, however, volume 410 defines a region of three-dimensional space in which ultrasonic emitters 200a-200d may create an acoustic hologram by generating sound waves that exert ARFs within printing region 410.

Figure 5:
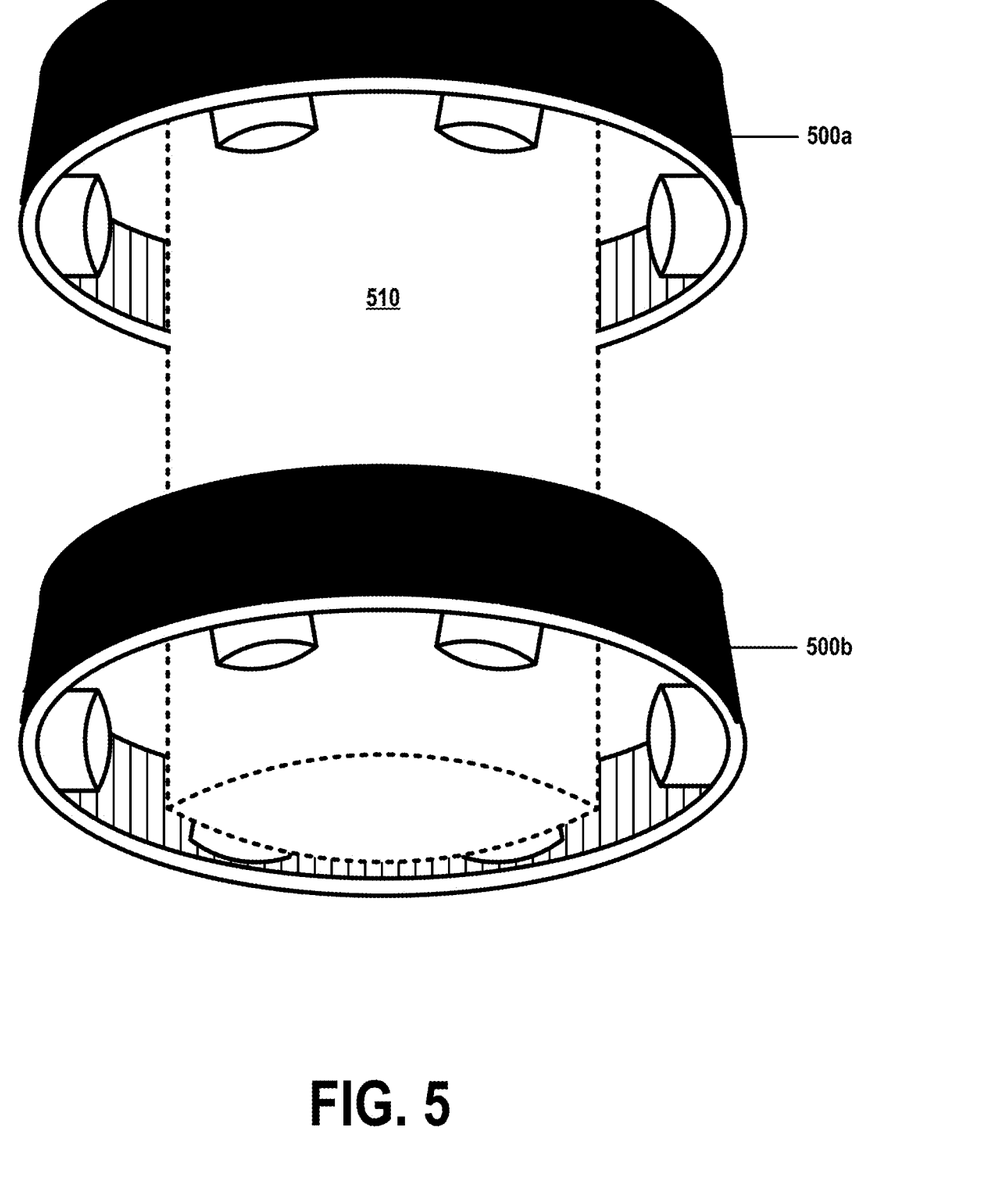
FIG. 5 shows an exemplary configuration of sound-wave emitter arrays in a 3D printer in accordance with embodiments of the present invention.

In certain embodiments, printing volumes, such as 310 of FIG. 3, 410 of FIG. 4, and 510 of FIG. 5, may be enclosed in a sealed or partially sealed printing chamber that contains air or another mixture of one or more gases. This printing chamber may be configured to maintain a particular state of the gases enclosed by the chamber. Such a state may be defined by parameters such as gas pressure, density, or temperature.

FIG. 5 shows yet another exemplary configuration of sound-wave emitter arrays in a 3D printer in accordance with embodiments of the present invention. FIG. 5 shows elements identified by reference numbers 500a-510.

In the example of FIG. 5, ultrasonic emitters are organized into two annular arrays 500a-500b that together produce standing waves capable of exerting ARFs within a cylindrical printing volume 510. This allows the 3D printer to generate acoustic holograms at any point within the cylindrical volume 510, so long as all surfaces of the hologram fall within the boundaries of the volume 510.

FIGS. 3-5 show just a few of the many possible configurations of arrays and of emitters in an array that are possible in embodiments of the present invention. Many other configurations are possible, in which emitters are organized into different geometric shapes or patterns that are designed to facilitate different sorts of printing tasks. For example, in a 3D printer intended to print various types of tubular objects, a sequence of ring-shaped arrays, similar to the two arrays 500a and 500b of FIG. 5 may be configured in order to produce an elongated printing volume.

Other embodiments may position sprayers, sprayer nozzles, and reflectors at any sort of location relative to a printing volume, as desired by a designer or implementer. In some embodiments, the locations or orientations of emitters, arrays, sprayers, nozzles, or reflectors may be adjustable, in order to allow a user, a computer system or embedded processor, or a software application to configure the 3D printer for specific jobs.

For example, if a printer similar to that shown in FIG. 4 is normally configured to print large sphere-like objects, it may be possible to reduce power consumption and save resources when printing a smaller object by automatically reducing the distance between arrays 200a-200d and reducing the number of active emitters or lowering the intensity of sound waves produced by each active emitter. In another example, the printer-controller software or hardware comprised by the printer of FIG. 4 may be configured to determine that only one of the four emitters 200a-200d (supplemented by a reflector) is required to print a flat rectangular object. In response to that determination, the printer might automatically use only emitter 200a and a subset of all available nozzles when printing that flat object.

Figure 6A:
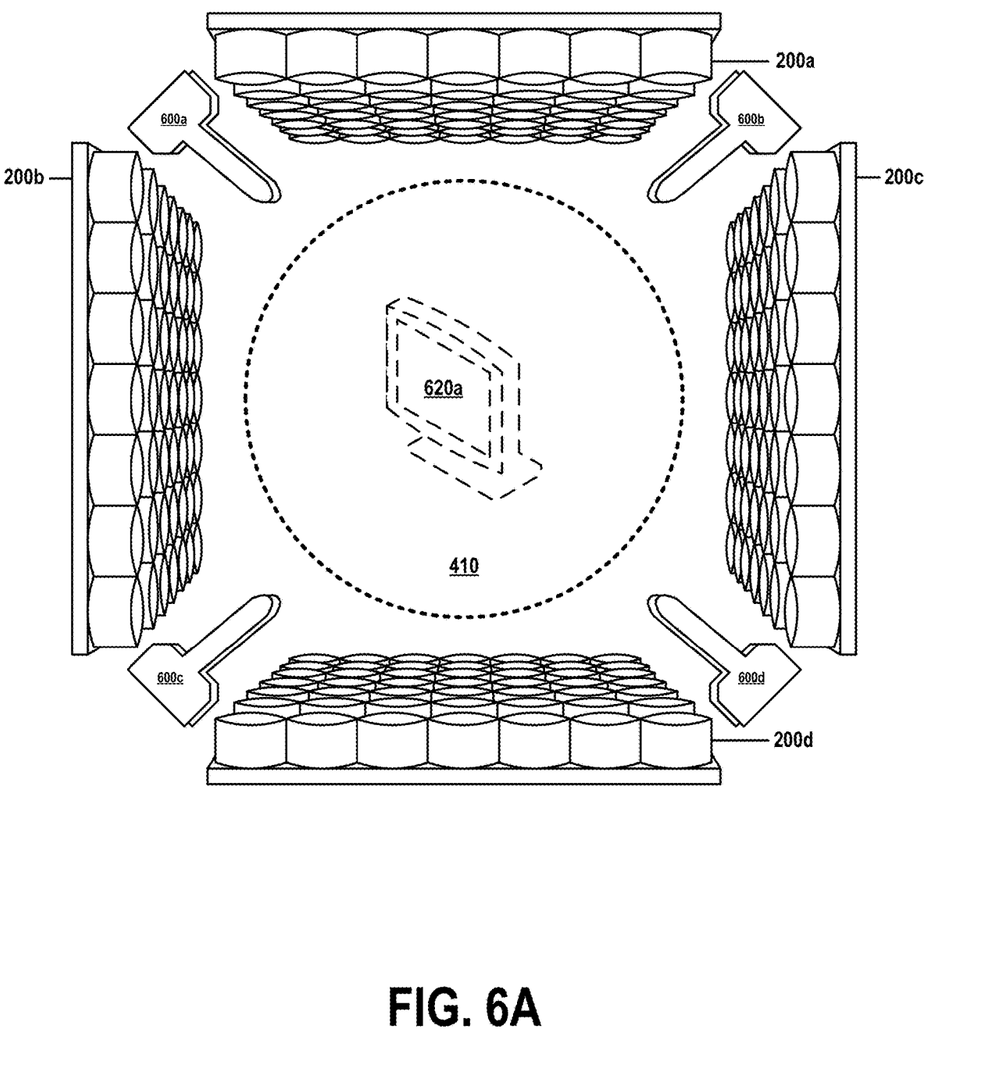
FIG. 6A shows an exemplary 3D printer, including sprayer nozzles, generating an acoustic hologram in accordance with embodiments of the present invention.

FIG. 6A shows an exemplary 3D printer, including sprayer nozzles, generating an acoustic hologram in accordance with embodiments of the present invention. FIG. 6A contains items 200a-620a. Items 200a-200d and 410 are similar in form and function to identically numbered items in FIG. 4.

Items 600a-600d each represent a sprayer or other type of applicator designed to deliver building materials to the surface of an acoustic hologram 620a created by emitter arrays 200a-200d within a printing volume or region 410.

The exemplary depiction of these items in FIG. 6A should not be construed to limit embodiments of the present invention to the precise configuration shown in FIG. 6A. Other embodiments may comprise different numbers, orientations, positions, or configurations of emitter arrays 200 200a-200d, sprayers 600a-600d, and printing volume 410. An embodiment might, for example, comprise only two sprayers or might comprise hundreds of sprayers, and these sprayers may be located, oriented, organized, or arranged in any configuration desired by an implementer, in order to apply a building material or other type of 3D-printing medium to acoustic hologram 620a.

Acoustic hologram 620a is, as described earlier, a seemingly tangible three-dimensional object generated by acoustic radiation forces (ARFs). These forces are produced at points in space within printing volume 410 by standing waves created by ultrasonic emitter arrays 200a-200d. The precise position and intensity of each force is determined by the configurations of arrays 200a-200d, in accordance with known methods of producing acoustic holograms. In some embodiments, hologram 620a is not visible, but other embodiments may use a known imaging technology or other known method to create a visible representation of the hologram 620a. In all embodiments, however, hologram 620a will be created such that ARFs at the apparent surfaces of the hologram 620a are great enough to impede the motion of a building medium sprayed or otherwise delivered to the surfaces by applicators 600a-600d.

Figure 6B:
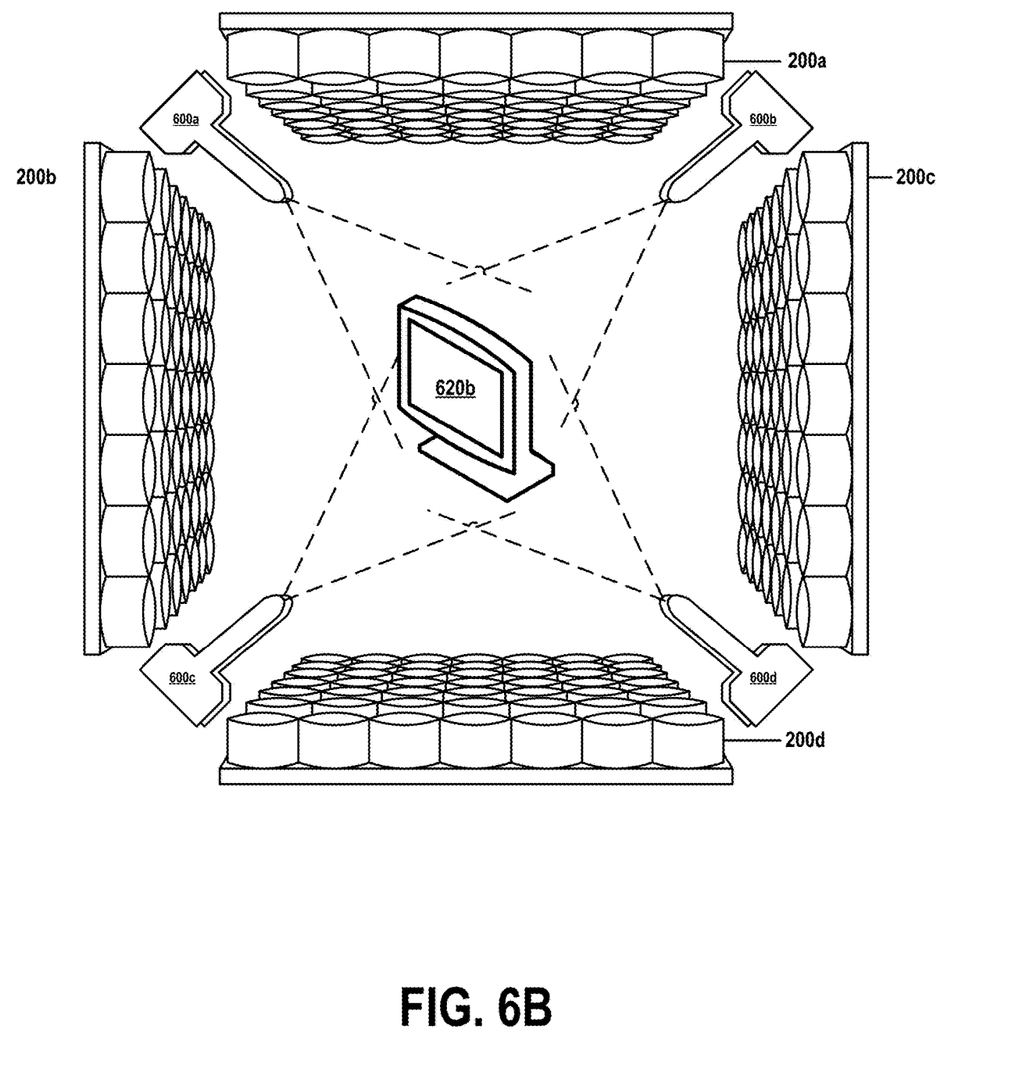
FIG. 6B shows the 3D printer of FIG. 6A printing a 3D object by spraying material onto the surface of an acoustic hologram.

FIG. 6B shows the 3D printer of FIG. 6A printing a 3D object by spraying material onto the surface of an acoustic hologram. FIG. 6B comprises items 200a-620b. Items 200a-600d are similar in form and function to identically numbered items in FIG. 6A.

Figure 7:
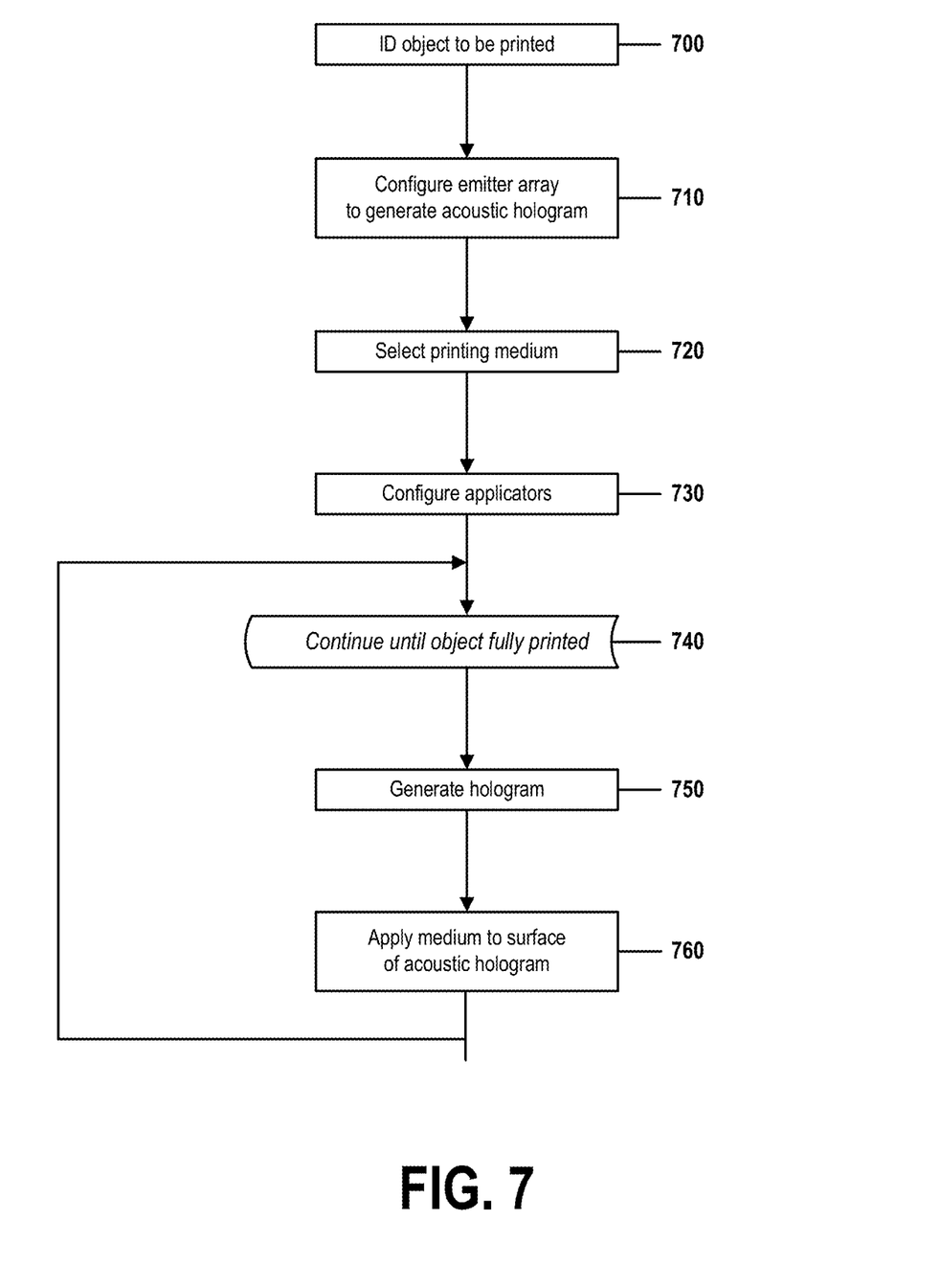
FIG. 7 is a flow chart that describes steps for a method of 3D printing on the surface of an acoustic hologram in accordance with embodiments of the present invention.

Unlike FIG. 6A, FIG. 6B shows sprayers/applicators 600a-600d spraying or otherwise applying Item 620b represents a three-dimensional object printed over the surface of FIG. 6A's acoustic hologram 620a, according to methods described in FIG. 7. This 3D-printing process may be performed by any printing method known in the art or described in this document, such as by spraying droplets of fast-drying material from applicators 600a-600d onto the tangible "surface" of acoustic hologram 620a.

FIG. 7 is a flow chart that describes steps for a method of 3D printing on the surface of an acoustic hologram. FIG. 7 contains steps 700-760.

In step 700, a 3D printer, similar to those described in the above figures, receives an identification of a three-dimensional object to be fabricated or "printed." This identification may be made by any means known in the art, such as by identifying a location of a previously defined object stored in a repository, by identifying a template object and a set of parameters that define an instance of the template object to be printed, or by expressly identifying all parameters of the object to be printed.

As described above and shown in the figures, the 3D printer comprises one or more arrays of sound-wave emitters 200a-200d and one or more sprayers or applicators 600a-600d capable of delivering a 3D-printing medium into a printing chamber, region, area, or volume 310, 410, or 510.

In step 710, the printer responds to the identification by configuring the one or more arrays of sound-wave emitters 200a-200d to produce an acoustic hologram of the object to be printed. This configuring may be performed by any means known in the art, such as those described by references cited in the introductory sections of this document's DETAILED DESCRIPTION.

When thus configured, the emitters will be configured to produce a set of standing waves in a printing chamber or within another three-dimensional printing region, area, or volume by means of technologies and techniques described above and in the cited references. The configuring may be performed by means of any mechanism known in the art and supported by the particular hardware or software capabilities of the 3D printer. For example, the configuring may be performed by selecting a subset of emitters to be used, by physically repositioning or reorienting certain emitters or emitter arrays, or by adjusting a characteristic of an emitted sound wave, such as a frequency, intensity, or direction of the wave.

These standing waves will be selected to produce acoustic radiation forces (ARFs) at specific locations within the chamber, region, area, or volume, such that the ARFs in aggregate form an acoustic hologram 620a. This hologram 620a will create a tactile illusion of the object to be printed within the chamber, region, area, or volume.

In step 720, the 3D printer may select one or more printing media that will be applied to the acoustic hologram 620a. This selection may be performed in embodiments where a specific medium is required to print a particular three-dimensional object, such as when an object is to be printed with a specific hardness, density, melting point, or This step may be omitted in embodiments that do not comprise the ability to print objects with more than one type of medium.

In step 730, the 3D printer may configure sprayers or other types of applicators 600a-600d in order to print the particular object identified in step 700. For example, a printer that comprises spray applicators may be configured to produce streams of droplets that assume a particular radiation pattern or direction, or to produce droplets of a particular size or kinetic energy. In some cases, this configuring may comprise selecting a set of time-varying settings such that parameters of the medium-application procedure vary during the time when the object is being printed.

In certain embodiments, this configuration may further comprise configuring the gaseous environment within which a 3D object 320b is printed onto an acoustic hologram 320a. Such configuring may comprise adjusting physical properties of the gaseous environment, such as pressure, temperature, humidity, or chemical composition.

Step 730 may be omitted in embodiments where the 3D printer does not support an ability to so configure its applicators or the contents of its printing volume.

Step 740 begins an iterative procedure of steps 740-760. In embodiments in which a 3D-printing job is performed by means of a single pass, steps 750 and 760 may be performed only once. But in more complex embodiments, where an object requires multiple passes, the iterative procedure may be repeated once for each pas.

A 3D-printing job may require multiple passes when, for example, a printed object is to be composed of multiple layers of different materials, when an object must be rotated or repositioned between passes in order to allow the printer to print onto certain surfaces of the object, or when a certain thickness of printing medium must be built up by applying multiple layers of medium.

In step 750, the 3D printer directs one or more of its arrays of emitters 200a-200d to create, by means known in the art, the three-dimensional acoustic hologram 320a in a printing chamber, area, region, or volume. This directing may be performed according to the configuration parameters determined in step 710 in response to the identification in step 700 of the object to be printed.

In cases where multiple iterations of the procedure of steps 740-760 are required, this step may comprise generating an acoustic hologram 320a that comprises a characteristic different from that of a previously created hologram 320a. This step may also comprise generating an intermediate set of ARFs capable of moving or changing a physical orientation of a printed object 320b printed during previous iterations of the procedure of steps 740-760. In such cases, this capability allows the 3D printer to perform tasks like printing objects that comprise encased internal structures, or printing an object that must be turned or otherwise repositioned in order to expose all of its surfaces to applicators 600a-600d.

In step 760, the 3D printer directs one or more of its applicators 600a-600d to apply a printing material or medium, by means known in the art, to the acoustic hologram 320a generated in step 750. This directing may be performed according to the configuration parameters determined in steps 710-720 in response to the identification in step 700 of the object to be printed.

In cases where multiple iterations of the procedure of steps 740-760 are required, this step may comprise spraying or otherwise applying different types of printing medium to the hologram 320*a* generated in step 750, or may comprise spraying or otherwise applying the printing medium under different physical conditions, as described in step 720.

At the conclusion of the last iteration of the iterative procedure of steps 740-760, the 3D printer will have completely printed a three-dimensional object by applying one or more printing media to the surfaces of one or more acoustic holograms 320*a*.

What is claimed is:

1. A 3D-printing system comprising a processor, a memory coupled to the processor, one or more arrays of sound-wave emitters, one or more spraying components, and a computer-readable hardware storage device coupled to the processor, the storage device containing program code configured to be run by the processor via the memory to implement a method for 3D printing on the surface of an acoustic hologram, the method comprising:
   the printer receiving an identification of a three-dimensional object to be printed;
   the printer, in response to the receiving, directing an emitter array of the one or more arrays of sound-wave emitters to generate an acoustic hologram,
      where the acoustic hologram is an invisible but tactile three-dimensional representation of the object to be printed; and
   the printer, in response to the receiving, instructing a sprayer of the one or more spraying components to spray a printing medium onto a surface of the acoustic hologram, such that the printing medium solidifies on the surface of the acoustic hologram to form a solid representation of a corresponding surface of the three-dimensional object to be printed.

2. The 3D-printing system of claim 1,
   where the sprayed printing medium is a fluid comprised of droplets that condense into a solid surface upon contact with the surface of the acoustic hologram.

3. The 3D-printing system of claim 1,
   where the acoustic hologram is generated within a three-dimensional print area filled with a gaseous medium, and
   where the sprayed printing medium begins to solidify upon contact with the gaseous medium.

4. The 3D-printing system of claim 1, where a sound-wave emitter comprised by the one or more arrays of sound-wave emitters emits an ultrasonic sound wave.

5. The 3D-printing system of claim 1,
   where the directing comprises adjusting a direction, amplitude, or frequency of a sound wave emitted by a sound-wave emitter comprised by the emitter array such that a standing wave is formed within a three-dimensional print area that contains the acoustic hologram, and
   where the standing wave exerts an acoustic radiation force at a location on the surface of the acoustic hologram capable of interrupting a trajectory of a sprayed droplet of the sprayed printing medium.

6. The 3D-printing system of claim 1,
   further comprising one or more acoustic reflectors capable of reflecting a sound wave emitted by a sound-wave emitter comprised by the emitter array such that a standing wave is formed within a three-dimensional print area that contains the acoustic hologram.

7. The 3D-printing system of claim 1, further comprising:
   the printer adjusting a physical characteristic of a gaseous medium that fills a three-dimensional print area that contains the acoustic hologram, such that the adjusting alters an amount of time necessary for the sprayed printing medium to solidify on the surface of the acoustic hologram.

8. A method for 3D printing on the surface of an acoustic hologram, the method comprising:
   a 3D-printing system, where the system comprises a processor, a memory coupled to the processor, one or more arrays of sound-wave emitters, one or more spraying components, and a computer-readable hardware storage device coupled to the processor, the storage device containing program code configured to be run by the processor via the memory to implement the method for 3D printing on the surface of an acoustic hologram, the method comprising:
   the printer receiving an identification of a three-dimensional object to be printed;
   the printer, in response to the receiving, directing an emitter array of the one or more arrays of sound-wave emitters to generate an acoustic hologram,
      where the acoustic hologram is an invisible but tactile three-dimensional representation of the object to be printed; and
   the printer, in response to the receiving, instructing a sprayer of the one or more spraying components to spray a printing medium onto a surface of the acoustic hologram, such that the printing medium solidifies on the surface of the acoustic hologram to form a solid representation of a corresponding surface of the three-dimensional object to be printed.

9. The method of claim 8,
   where the sprayed printing medium is a fluid comprised of droplets that condense into a solid surface upon contact with the surface of the acoustic hologram.

10. The method of claim 8,
    where the acoustic hologram is generated within a three-dimensional print area filled with a gaseous medium, and
    where the sprayed printing medium begins to solidify upon contact with the gaseous medium.

11. The method of claim 8, where a sound-wave emitter comprised by the one or more arrays of sound-wave emitters emits an ultrasonic sound wave.

12. The method of claim 8,
    where the directing an emitter array comprises adjusting a direction, amplitude, or frequency of a sound wave emitted by a sound-wave emitter comprised by the emitter array such that a standing wave is formed within a three-dimensional print area that contains the acoustic hologram, and
    where the standing wave exerts an acoustic radiation force at a location on the surface of the acoustic hologram capable of interrupting a trajectory of a sprayed droplet of the sprayed printing medium.

13. The method of claim 8,
    further comprising one or more acoustic reflectors capable of reflecting a sound wave emitted by a sound-wave emitter comprised by the emitter array such that a standing wave is formed within a three-dimensional print area that contains the acoustic hologram.

14. The method of claim 8, further comprising providing at least one support service for at least one of creating, integrating, hosting, maintaining, and deploying computer-readable program code in the computer system, wherein the computer-readable program code in combination with the computer system is configured to implement the receiving, the directing, and the instructing.

15. A computer program product, comprising a computer-readable hardware storage device having a computer-readable program code stored therein, the program code configured to be executed by 3D-printing system comprising a processor, a memory coupled to the processor, one or more arrays of sound-wave emitters, one or more spraying components, and a computer-readable hardware storage device coupled to the processor, the storage device containing program code configured to be run by the processor via the memory to implement a method for 3D printing on the surface of an acoustic hologram, the method comprising:

the printer receiving an identification of a three-dimensional object to be printed;

the printer, in response to the receiving, directing an emitter array of the one or more arrays of sound-wave emitters to generate an acoustic hologram, where the acoustic hologram is an invisible but tactile three-dimensional representation of the object to be printed; and the printer, in response to the receiving, instructing a sprayer of the one or more spraying components to spray a printing medium onto a surface of the acoustic hologram, such that the printing medium solidifies on the surface of the acoustic hologram to form a solid representation of a corresponding surface of the three-dimensional object to be printed.

16. The computer program product of claim 15, where the sprayed printing medium is a fluid comprised of droplets that condense into a solid surface upon contact with the surface of the acoustic hologram.

17. The computer program product of claim 15, where the acoustic hologram is generated within a three-dimensional print area filled with a gaseous medium, and where the sprayed printing medium begins to solidify upon contact with the gaseous medium.

18. The computer program product of claim 15, where a sound-wave emitter comprised by the one or more arrays of sound-wave emitters emits an ultrasonic sound wave.

19. The computer program product of claim 15, where the directing an emitter array comprises adjusting a direction, amplitude, or frequency of a sound wave emitted by a sound-wave emitter comprised by the emitter array such that a standing wave is formed within a three-dimensional print area that contains the acoustic hologram, and where the standing wave exerts an acoustic radiation force at a location on the surface of the acoustic hologram capable of interrupting a trajectory of a sprayed droplet of the sprayed printing medium.

20. The computer program product of claim 15, further comprising one or more acoustic reflectors capable of reflecting a sound wave emitted by a sound-wave emitter comprised by the emitter array such that a standing wave is formed within a three-dimensional print area that contains the acoustic hologram.

* * * * *